US009567243B2

(12) United States Patent
Elku et al.

(10) Patent No.: US 9,567,243 B2
(45) Date of Patent: Feb. 14, 2017

(54) CLEANING APPARATUS, RADIATION SOURCE MODULE AND FLUID TREATMENT SYSTEM

(75) Inventors: Joseph Elku, Tillsonburg (CA); Douglas Penhale, London (CA)

(73) Assignee: TROJAN TECHNOLOGIES INC., London (CA)

(*) Notice: Subject to any disclaimer, the term of this patent is extended or adjusted under 35 U.S.C. 154(b) by 0 days.

(21) Appl. No.: 13/386,615

(22) PCT Filed: Jul. 23, 2010

(86) PCT No.: PCT/CA2010/001147
§ 371 (c)(1),
(2), (4) Date: Apr. 6, 2012

(87) PCT Pub. No.: WO2011/014944
PCT Pub. Date: Feb. 10, 2011

(65) Prior Publication Data
US 2012/0181446 A1    Jul. 19, 2012

Related U.S. Application Data

(60) Provisional application No. 61/213,866, filed on Jul. 23, 2009.

(51) Int. Cl.
*G01N 21/00* (2006.01)
*C02F 1/32* (2006.01)

(52) U.S. Cl.
CPC ......... *C02F 1/325* (2013.01); *C02F 2201/324* (2013.01); *C02F 2201/3225* (2013.01); *C02F 2201/3227* (2013.01)

(58) Field of Classification Search
None
See application file for complete search history.

(56) References Cited

U.S. PATENT DOCUMENTS 5,006,233 A * 4/1991 Muisener ............... C02F 1/325
                                                         210/106
5,874,740 A * 2/1999 Ishiyama ............... C02F 1/325
                                                         250/431
(Continued)

FOREIGN PATENT DOCUMENTS

CA    WO 0026144 A1 * 5/2000 ............. C02F 1/325
CA    WO 0112560 A1 * 2/2001 ............. B08B 1/008
(Continued)

OTHER PUBLICATIONS

Communication: Publication of International Search Report for International Patent Application No. PCT/CA2010/001147 mailed Nov. 19, 2010.
(Continued)

*Primary Examiner* — Andrew Smyth
(74) *Attorney, Agent, or Firm* — Katten Muchin Rosenman LLP

(57) ABSTRACT

There is disclosed a cleaning apparatus for a radiation source assembly in a fluid treatment system. The clean apparatus comprises a cleaning sleeve moveable to remove fouling materials from an exterior portion of the radiation source assembly, the cleaning sleeve comprising at least one chamber for receiving a cleaning fluid and a cleaning sleeve inlet in fluid communication with the at least one chamber and a first conduit element for conveying the cleaning fluid to the cleaning sleeve inlet, the first conduit element being configured such that a distal portion of the first conduit element is in fluid communication with the cleaning sleeve inlet and a proximal portion of the first conduit element is disposed outside of fluid being treated in the fluid treatment system.

41 Claims, 12 Drawing Sheets

(56) References Cited

U.S. PATENT DOCUMENTS

| | | | |
|---|---|---|---|
| 6,013,917 A * | 1/2000 | Ishiyama | C02F 1/325 250/431 |
| 6,076,197 A * | 6/2000 | Yeung | A47K 13/302 4/233 |
| 6,342,188 B1 * | 1/2002 | Pearcey | C02F 1/325 204/660 |
| RE38,173 E * | 7/2003 | Ishiyama | C02F 1/325 250/431 |
| 6,646,269 B1 * | 11/2003 | Traubenberg | C02F 1/325 250/431 |
| 6,659,431 B1 * | 12/2003 | Fang | B08B 1/008 250/431 |
| RE39,522 E * | 3/2007 | Ishiyama | C02F 1/325 250/431 |
| 7,323,694 B2 * | 1/2008 | Traubenberg | B01J 19/123 204/660 |
| 7,838,845 B2 * | 11/2010 | Abe | C02F 1/32 250/432 R |
| 8,692,209 B2 * | 4/2014 | Kruger | C02F 1/325 250/431 |
| 2003/0080071 A1 * | 5/2003 | Williamson | A61L 2/08 210/748.11 |
| 2005/0051741 A1 * | 3/2005 | Hallett | A61L 2/10 250/504 R |
| 2005/0211639 A1 * | 9/2005 | Nguyen | B63J 4/002 210/205 |
| 2005/0253086 A1 * | 11/2005 | Snowball | A61L 2/10 250/435 |
| 2006/0091326 A1 * | 5/2006 | Traubenberg | B01J 19/123 250/497.1 |
| 2008/0203004 A1 * | 8/2008 | Abe | C02F 1/32 210/205 |
| 2008/0283467 A1 * | 11/2008 | Nguyen | B63B 35/00 210/600 |
| 2009/0294689 A1 * | 12/2009 | Fraser | A61L 2/10 250/436 |
| 2010/0032030 A1 * | 2/2010 | Peterson | C02F 1/325 137/561 R |
| 2012/0181446 A1 * | 7/2012 | Elku | C02F 1/325 250/454.11 |

FOREIGN PATENT DOCUMENTS

| | | | | |
|---|---|---|---|---|
| CA | WO 2010102383 A1 * | 9/2010 | | C02F 1/325 |
| CH | 2123359 A1 * | 11/2009 | | B01L 3/0217 |
| CH | 2123359 B1 * | 6/2011 | | B01L 3/0217 |
| CN | 1745851 A | 3/2006 | | |
| JP | 2009011878 A * | 1/2009 | | |
| JP | 2009131838 A * | 6/2009 | | |
| KR | 2005074718 A * | 7/2005 | | G01N 21/33 |
| KR | 20050074718 A * | 7/2005 | | |
| WO | 0026144 A1 | 5/2000 | | |
| WO | 0112560 A1 | 2/2001 | | |
| WO | 2010102383 A1 | 9/2010 | | |

OTHER PUBLICATIONS

Office Action for Canadian Patent Application No. 2,768,256 with a mailing date of May 22, 2013.
The First Office Action for Chinese Patent Application No. 201080033056.7, with a mailing date of Jul. 10, 2013.
The Second Office Action for Chinese Patent Application No. 201080033056.7, with a mailing date of Feb. 18, 2014.
The Third Office Action for Chinese Patent Application No. 201080033056.7, with a mailing date of Oct. 10, 2014.

* cited by examiner

CLEANING APPARATUS, RADIATION SOURCE MODULE AND FLUID TREATMENT SYSTEM

This application is a national stage of PCT/CA2010/001147, filed on Jul. 23, 2010, which claims priority to U.S. Provisional Patent Application No. 61/213,866, filed on Jul. 23, 2009. Each of these documents is incorporated herein by reference in its entirety.

CROSS-REFERENCE TO RELATED APPLICATION

The present application claims the benefit under 35 U.S.C. §119(e) of provisional patent application Ser. No. 61/213,866, filed Jul. 23, 2009, the contents of which are hereby incorporated by reference.

BACKGROUND OF THE INVENTION

Field of the Invention

In one of its aspects, the present invention relates to a fluid treatment system. In another of its aspects, the present invention relates to a cleaning apparatus. In yet another of its aspects, the present invention relates to a radiation source module containing the cleaning system. In another of its aspects, the present invention relates to a method of removing fouling materials from an exterior surface of a radiation source assembly. Other aspects of the invention will become apparent to those of skill in the art upon reviewing the present specification.

Description of the Prior Art

Fluid treatment systems are known generally in the art.

For example, U.S. Pat. Nos. 4,482,809, 4,872,980 and 5,006,244 [all in the name of Maarschalkerweerd and hereinafter referred to as the Maarschalkerweerd #1 Patents] all describe gravity fed fluid treatment systems which employ ultraviolet (UV) radiation.

Such systems include an array of UV lamp frames which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the fluid's flow rate past the lamps. Typically, one or more UV sensors may be employed to monitor the UV output of the lamps and the fluid level is typically controlled, to some extent, downstream of the treatment device by means of level gates or the like.

In recent years, there has been interest in the so-called "transverse-to-flow" fluid treatment systems. In these systems, the radiation source is disposed in the fluid to be treated in a manner such that the longitudinal axis of the radiation source is in a transverse (e.g., orthogonal vertical orientation of the radiation sources) relationship with respect to the direction of fluid flow past the radiation source. See, for example, any one of:

International Publication Number WO 2004/000735 [Traubenberg et al.];

International Publication Number WO 2008/055344 [Ma et al.];

International Publication Number WO 2008/019490 [Traubenberg et al.];

U.S. Pat. No. 7,408,174 [From et al.]; and

U.S. provisional patent application Ser. No. 61/193,686 [Penhale et al.], filed Dec. 16, 2008.

Depending on the quality of the fluid which is being treated, the sleeves surrounding the UV lamps periodically become fouled with foreign materials, inhibiting their ability to transmit UV radiation to the fluid. For a given installation, the occurrence of such fouling may be determined from historical operating data or by measurements from the UV sensors. Once fouling has reached a certain point, the sleeves must be cleaned to remove the fouling materials and optimize system performance.

Regardless of whether the UV lamp modules are employed in an open channel system (e.g., such as the one described and illustrated in Maarschalkerweerd #1 Patents) or a tranverse to flow system as described above, one or more of the modules may be removed while the system continues to operate, and the removed frames may be immersed in a bath of suitable cleaning solution (e.g., a mild acid) which may be air-agitated to remove fouling materials. This practice was regarded by many in the field as inefficient, labourious and inconvenient.

In many cases, once installed, one of the largest maintenance costs associated with prior art fluid treatment systems is often the cost of cleaning the sleeves about the radiation sources.

U.S. Pat. Nos. 5,418,370, 5,539,210 and RE36,896 [all in the name of Maarschalkerweerd and hereinafter referred to as the Maarschalkerweerd #2 Patents] all describe an improved cleaning system, particularly advantageous for use in fluid treatment systems which employ UV radiation. Generally, the cleaning system comprises cleaning sleeves, each cleaning sleeve engaging a portion of the exterior of a radiation source assembly including a radiation source (e.g., a UV lamp). The cleaning sleeve is movable along the surface of the radiation source assembly. The cleaning sleeve includes a chamber in contact with the exterior surface of the radiation source assembly. The chamber is supplied with a cleaning fluid suitable for removing undesired materials from the exterior surface of the radiation source assembly.

The cleaning system described in the Maarschalkerweerd #2 Patents represented a significant advance in the art, particularly in that it facilitated in situ cleaning of the radiation source assembly without the need to remove the module(s) during operation of the fluid treatment system. However, when it becomes necessary to replace or replenish the cleaning fluid in the chamber of the cleaning sleeve, it is necessary to remove the module of radiation sources assemblies to which the cleaning sleeves are engaged and then manually fill the chamber of the cleaning sleeve with cleaning fluid.

Accordingly, it would be desirable to have a cleaning system in which it is possible to replace or replenish the cleaning fluid without the need to remove the module or radiation sources assemblies to which the cleaning sleeves are engaged.

SUMMARY OF THE INVENTION

It is an object of the present invention to obviate or mitigate at least one of the above-mentioned disadvantages of the prior art.

It is another object of the present invention to provide a novel cleaning apparatus for a radiation source assembly in a fluid treatment system.

It is another object of the present invention to provide a novel fluid treatment system.

Accordingly, in one of its aspects, the present invention provides a cleaning apparatus for a radiation source assembly in a fluid treatment system, the cleaning system comprising:

a cleaning sleeve moveable to remove fouling materials from an exterior portion of the radiation source assembly, the cleaning sleeve comprising at least one chamber for receiving a cleaning fluid and a cleaning sleeve inlet in fluid communication with the at least one chamber; and a first conduit element for conveying the cleaning fluid to the cleaning sleeve inlet, the first conduit element being configured such that a distal portion of the first conduit element is in fluid communication with the cleaning sleeve inlet and a proximal portion of the first conduit element is disposed outside of fluid being treated in the fluid treatment system.

The invention also relates to a radiation source module and to a fluid treatment system incorporating this cleaning apparatus.

Thus, in another of its aspects, the present invention provides a radiation source module for use in a fluid treatment system, the module comprising:

a frame having a first support member;

at least one radiation source assembly extending from the first support member, at least one radiation source assembly comprising a radiation source; and the present cleaning system, the cleaning sleeve being in contact with at least a portion of an exterior of the at least one radiation source assembly.

Thus, in yet another of its aspects, the present invention provides a fluid treatment system comprising a fluid treatment zone for receiving a flow of fluid and at least one radiation source module defined above, wherein the at least one radiation source module is configured such that the one radiation source assembly is disposed in the fluid treatment zone.

Thus, the present inventors have conceived of a novel cleaning apparatus which is particularly useful for removing fouling materials from a radiation source assembly including a radiation source such as an ultraviolet radiation-emitting lamp. Typically, such radiation source assemblies are used in fluid treatment systems such as water treatment systems (e.g., municipal waste water treatment, municipal drinking water treatment, industrial wastewater treatment and the like). The present cleaning apparatus is particularly advantageous since it allows for replacement or replenishment of cleaning fluid without the need to remove the radiation source assembly or the module containing it from active operation in the fluid treatment system. Thus, the extra costs and labour associated with the prior art approach of removing the radiation source assembly or module containing it to replenish or replace the cleaning fluid can be avoided. The present cleaning apparatus is characterized by having a conduit portion for feeding a cleaning fluid to a cleaning sleeve, which conduit portion is configured to have a proximal portion that emanates from the fluid being treated in the fluid treatment system. In other words, the dimension of the conduit portion is chosen such that, on the one hand, it is connected to the cleaning sleeve (or sleeves) while, on the other hand, it is accessible while the radiation source assembly or module containing it is in an active operational position in the fluid treatment system.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
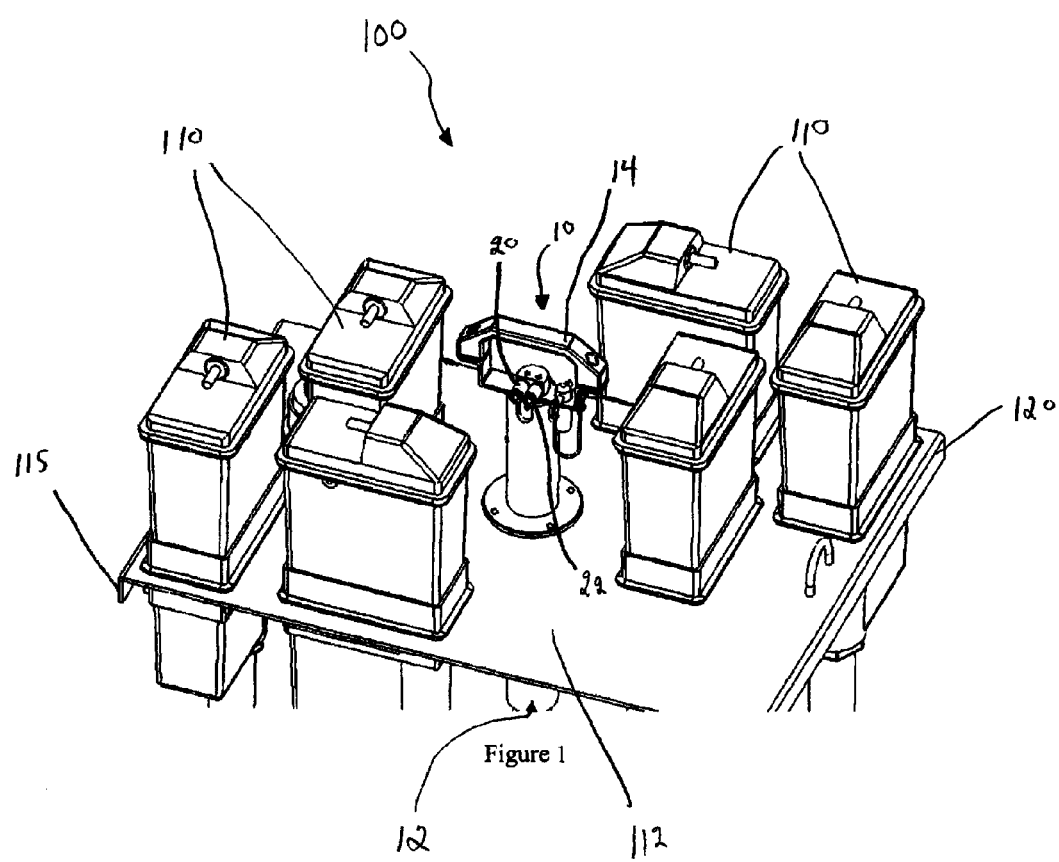
FIG. 1 illustrates an enlarged top view of a radiation source module incorporating a first embodiment of the present cleaning apparatus.
Figure 2:
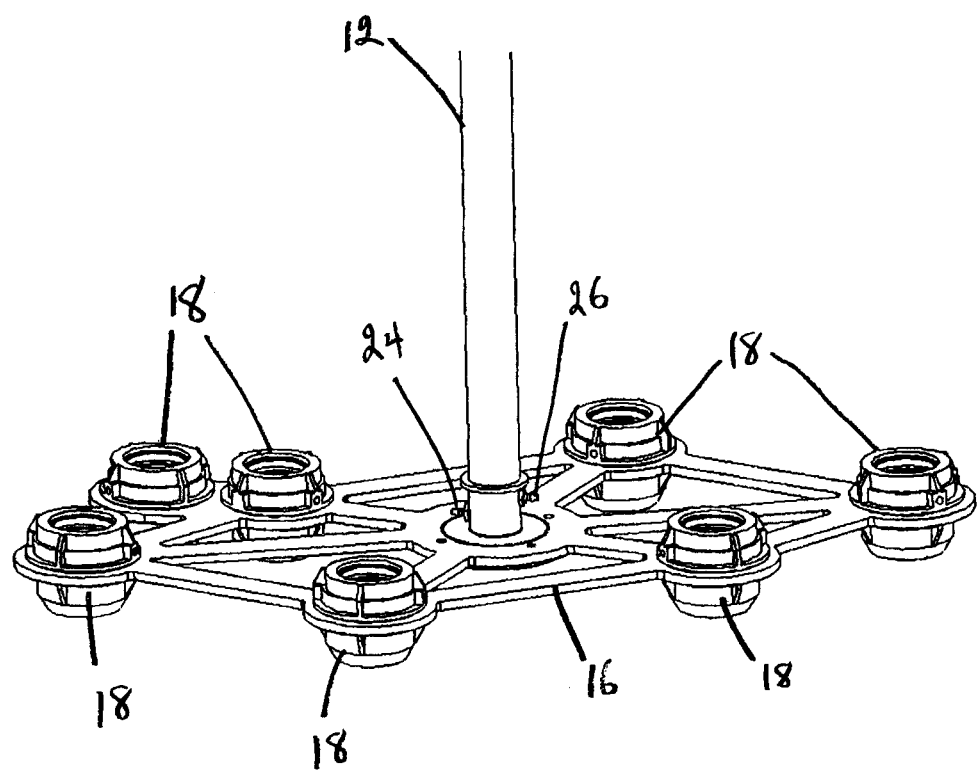
FIG. 2 illustrates an enlarged perspective view of a portion of the cleaning apparatus illustrated in FIG. 1.
Figure 3:
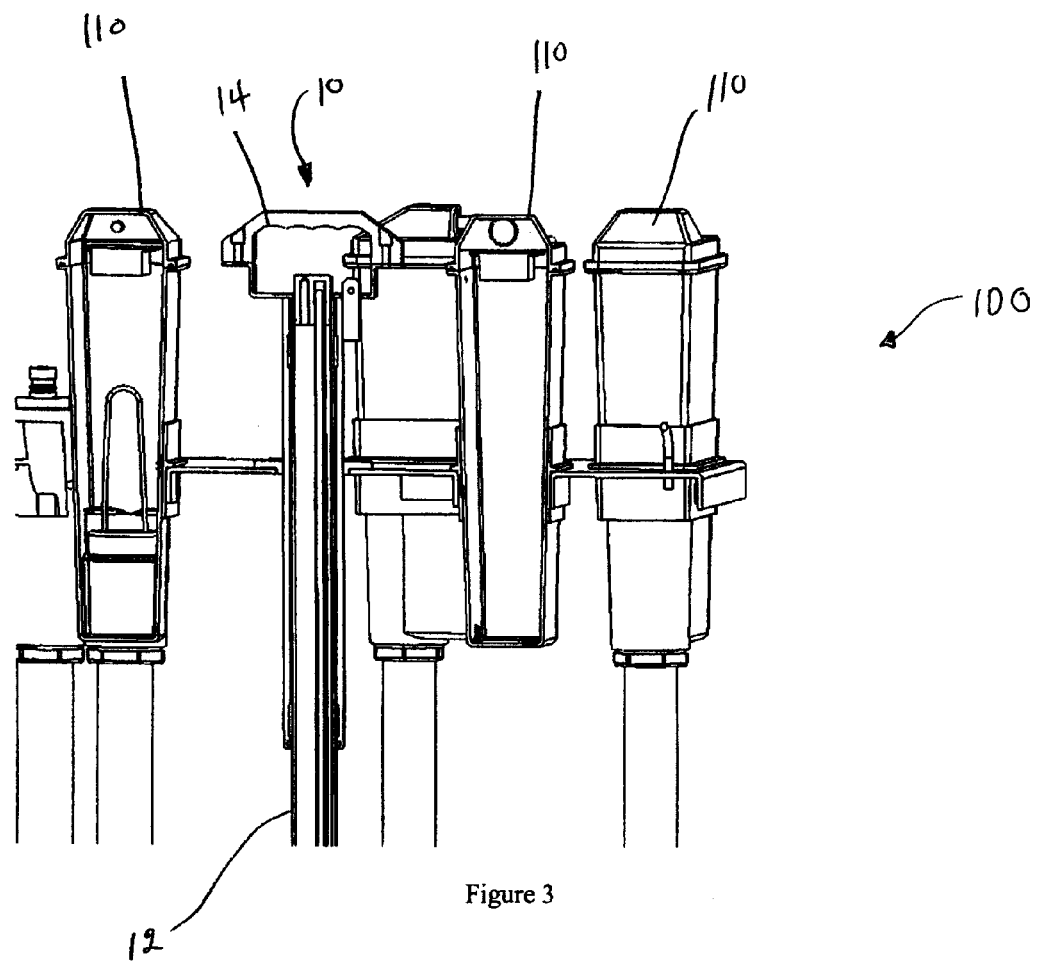
FIG. 3 illustrates a side elevation, in partial cross-section, of the radiation source module illustrated in FIG. 1.
Figure 4:
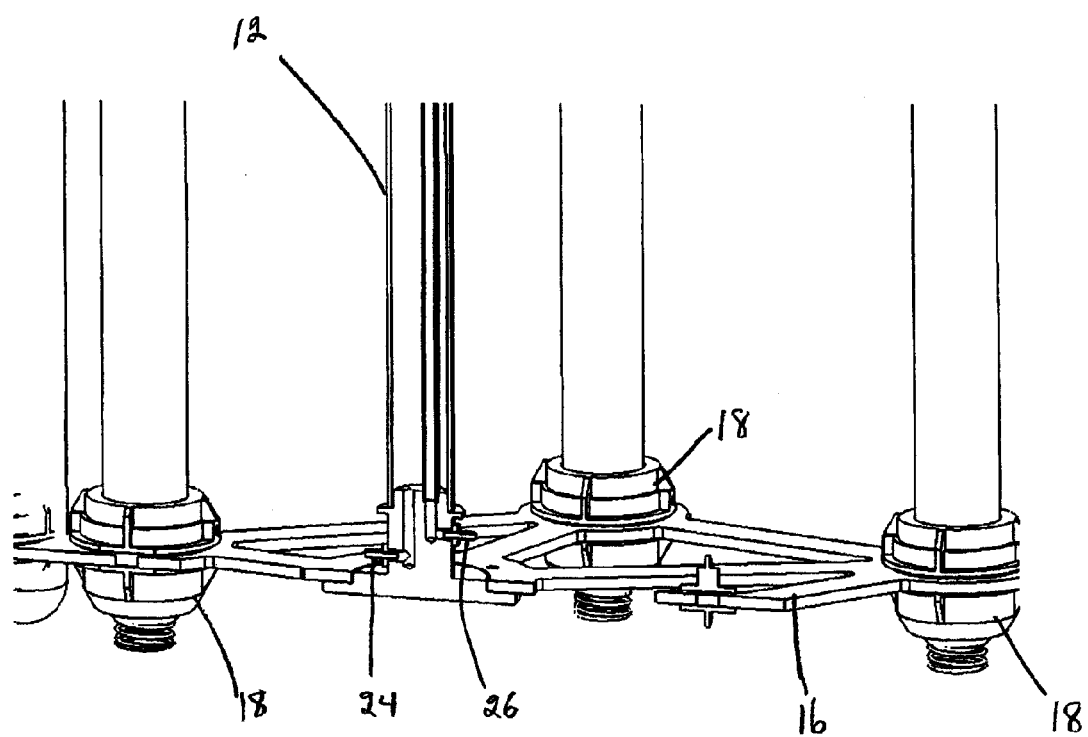
FIG. 4 illustrates an enlarged perspective view of a portion of the cleaning apparatus illustrated in FIG. 2.

In one of its aspects, the present invention relates to a cleaning apparatus. Preferred embodiments of the cleaning system may include any one or a combination of any two or more of any of the following features:

- the cleaning apparatus may comprise a second conduit element for conveying cleaning fluid from a cleaning sleeve outlet in fluid communication with the at least one chamber;
- the second conduit element may be configured such that a distal portion of the second conduit element may be in fluid communication with the cleaning sleeve outlet and a proximal portion of the second conduit element may be disposed outside of fluid being treated in the fluid treatment system
- at least a portion of the second conduit may be disposed with the first conduit;
- the combination of the first conduit and the second conduit may define a reservoir for the cleaning fluid;
- the combination of the first conduit and the second conduit may define a substantially annular reservoir for the cleaning fluid;
- the first conduit portion and the second conduit portion may be secured with respect to one another;
- the first conduit portion and the second conduit portion may combine to define an actuation portion that may be moveable with respect to the radiation source assembly;
- the actuation portion may comprise a handle portion for manual movement of the actuation tube;

the cleaning sleeve may be moveable between a retracted position and an extended position;

the proximal portion of the first conduit element may be disposed outside of fluid being treated in the fluid treatment system when the cleaning system is in the retracted position;

the proximal portion of the first conduit element may be submersed in the fluid being treated in the fluid treatment system when the cleaning system is in the extended position;

the proximal portion of the first conduit element may be: (i) disposed outside of fluid being treated in the fluid treatment system when the cleaning system is in the retracted position; and (ii) submersed in the fluid being treated in the fluid treatment system when the cleaning system is in the extended position;

the cleaning apparatus may further comprise a tube portion for receiving the proximal portion of the first conduit element when the cleaning system is in the retracted position;

the tube portion may comprise a cover element removable to gain access to the proximal portion of the first conduit portion;

the cleaning sleeve may comprise an annular ring portion;

the cleaning apparatus may comprise a cleaning carriage comprising a plurality of cleaning sleeves;

each cleaning sleeve may be configured to be engaged to an exterior of a radiation source assembly;

the plurality of cleaning sleeves may be in fluid communication with each other to define a cleaning fluid fill line in fluid communication with the first conduit portion;

pairs of cleaning sleeves may be in fluid communication with each other to define a cleaning fluid fill line in fluid communication with the first conduit portion;

the plurality of cleaning sleeves may be in fluid communication with each other to define a cleaning fluid return line in fluid communication with the second conduit portion;

pairs of cleaning sleeves may be in fluid communication with each other to define a cleaning fluid return line in fluid communication with the second conduit portion;

the cleaning carriage may comprise a plurality of cleaning sleeves disposed in a substantially annular relationship with respect to the first conduit portion;

wherein each cleaning sleeve may comprise a seal for sealing engagement with the portion of the exterior of the radiation source assembly, the seal removing at least a portion of undesired materials from the exterior of the radiation source assembly when the sleeve is moved;

each cleaning sleeve may comprise a pair of seals for sealing engagement with the portion of the exterior of the radiation source assembly, the seal: (i) removing at least a portion of undesired materials from the exterior of the radiation source assembly when the sleeve is moved, and (ii) substantially reducing or preventing leaking of cleaning fluid from the chamber the cleaning apparatus may further comprise motive means (automatic or semi-automatic) to move the cleaning sleeve between a first position and a second position.

The cleaning apparatus may be incorporated in a radiation source module that may include any one, or a combination of any two or more, of the following features:

the radiation source module may further comprise means to position the radiation source module in the fluid treatment system;

the at least one radiation source assembly may be in sealing engagement with the first support member;

the frame further may comprise a second support member opposed to and laterally spaced from the first support member, the at least one radiation source assembly disposed between each of the first support member and the second support member;

the frame may further comprise a third support member interconnecting the first support member and the second support member;

the frame may further comprise a power supply for controlling the radiation source;

the radiation source assembly may comprise a protective sleeve surrounding the radiation source;

the protective sleeve may comprise a quartz sleeve;

the protective sleeve may have an open end in sealed engagement with an opening in the first support member and a closed end supported by the second support member; and the open end may be sealed to prevent fluid contact with the radiation source.

The radiation source module may be incorporated in a fluid treatment system that may include any one or a combination of any two or more any of the following features:

the fluid treatment zone may be comprised in an open channel for receiving the flow of fluid;

the fluid treatment zone may be comprised in a closed channel for receiving the flow of fluid;

the at least one radiation source assembly may be elongate and have a longitudinal axis disposed transverse to the direction of fluid flow through the fluid treatment zone;

the at least one radiation source assembly may be elongate and have a longitudinal axis disposed substantially parallel to the direction of fluid flow through the fluid treatment zone;

the at least one radiation source assembly may be elongate and have a longitudinal axis disposed orthogonal to the direction of fluid flow through the fluid treatment zone; and the at least one radiation source assembly may be elongate and be disposed substantially vertically in the fluid treatment zone.

Thus, with reference to FIGS. 1-6, there is illustrated a radiation source module 100.

Radiation source module 100 is generally similar to the radiation source module described in co-pending U.S. provisional patent application Ser. No. 61/193,686, filed Dec. 16, 2008 [Penhale et al.]. Thus, radiation source module 100 comprises a series of radiation source cartridges 110 which are preferably constructed as described in the above-mentioned Penhale et al. provisional patent application. Radiation source module 100 comprises a mounting plate 112 having a pair of opposed rails 115,120. Preferably radiation source cartridges 110 are secured to mounting plate 112 as generally described in Paragraphs [0035] to [0036] of the above-mentioned Penhale et al. provisional patent application.

Also secured to mounting plate 112 is a cleaning apparatus 10. Cleaning apparatus 10 comprises an actuation tube 12. A handle 14 is secured to the proximal end of actuation tube 12. Disposed at the distal end of actuation tube 12 is a cleaning carriage 16 comprising a series of cleaning sleeves 18. Each cleaning sleeve 18 is engaged with the outer portion of a radiation source assembly contained in radiation source cartridge 110 (the radiation source assemblies are omitted from FIG. 2 for clarity but are shown, for example, in FIG. 4).

Disposed at the proximal end of actuation tube 12 is a cleaning fluid feed inlet 20 and a cleaning fluid return outlet 22. Disposed at the distal portion of actuation tube 12 is a cleaning fluid feed outlet 24 and a cleaning fluid return inlet 26. As can been seen with particular reference to FIG. 4, actuation tube 12 forms a reservoir (i.e., an annular reservoir) for containing cleaning fluid. Cleaning fluid feed outlet 24 is connected to a cleaning sleeve 18 by a suitable conduit or tube (not shown for clarity). That cleaning sleeve is connected in a similar fashion to another cleaning sleeve until all of the cleaning sleeves are similarly connected with the last cleaning sleeve being connected to cleaning fluid return inlet 26. In this fashion, cleaning sleeves 18 may be considered to be connected serially with respect to one another to cleaning fluid feed outlet 24 and cleaning return inlet 26. Of course, other arrangements of connecting cleaning sleeves 118 to cleaning fluid feed outlet 24 and cleaning fluid return inlet 26 are within the purview of those skilled in the art (e.g., parallel connections, etc.).

When it is desired to replace or replenish the cleaning fluid in cleaning apparatus 10, a pump and supply of cleaning fluid (not shown for clarity) are connected to cleaning fluid feed inlet 20 located in the proximal portion of actuation tube 12. An outlet tube (not shown for clarity) is connected to cleaning fluid return outlet 22. The pump is actuated and cleaning fluid then flows through cleaning fluid feed inlet 20 to the interior of actuation tube 12. Thereafter, the cleaning fluid flows from cleaning fluid feed outlet 24 to each of cleaning sleeves 18.

The serial connection between each of cleaning sleeves 18 results in cleaning fluid being fed to all of the cleaning sleeves and thereafter to cleaning fluid return inlet 26 located at the distal portion of actuation tube 12. This cleaning fluid then flows up through actuation tube 12 and out of cleaning apparatus 10 via cleaning fluid return outlet 22 located at the proximal portion of actuation tube 12. Fluid emanating from cleaning fluid return outlet 22 may be collected in a suitable overflow or similar reservoir. Once the fluid emanates in this fashion, cleaning sleeves 18 will be regarded as being sufficiently replenished with fresh cleaning fluid. This approach also allows for the return of old cleaning fluid and/or impurities and/or water that could be in the line and need to be flushed out.

Figure 5:
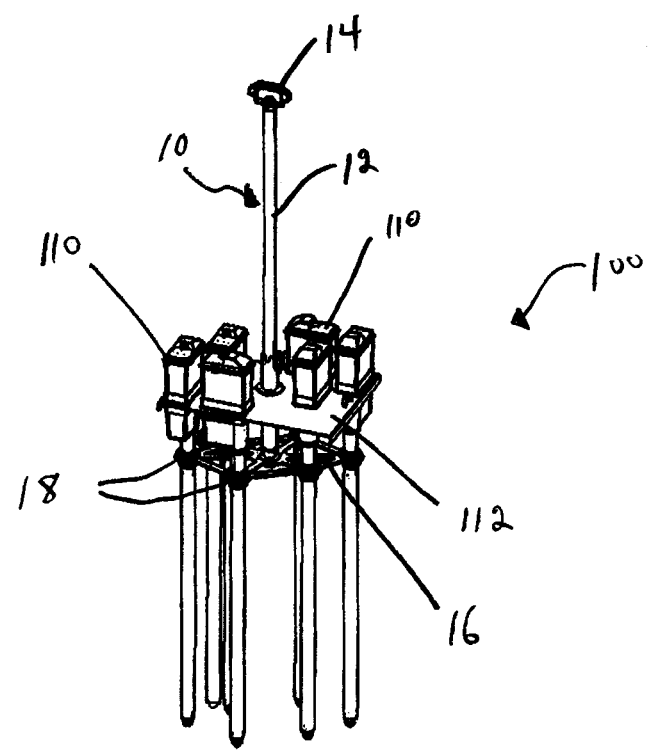
FIG. 5 illustrates a perspective view of the radiation source module illustrated in FIG. 1 wherein the cleaning apparatus is in the retracted position.
Figure 6:
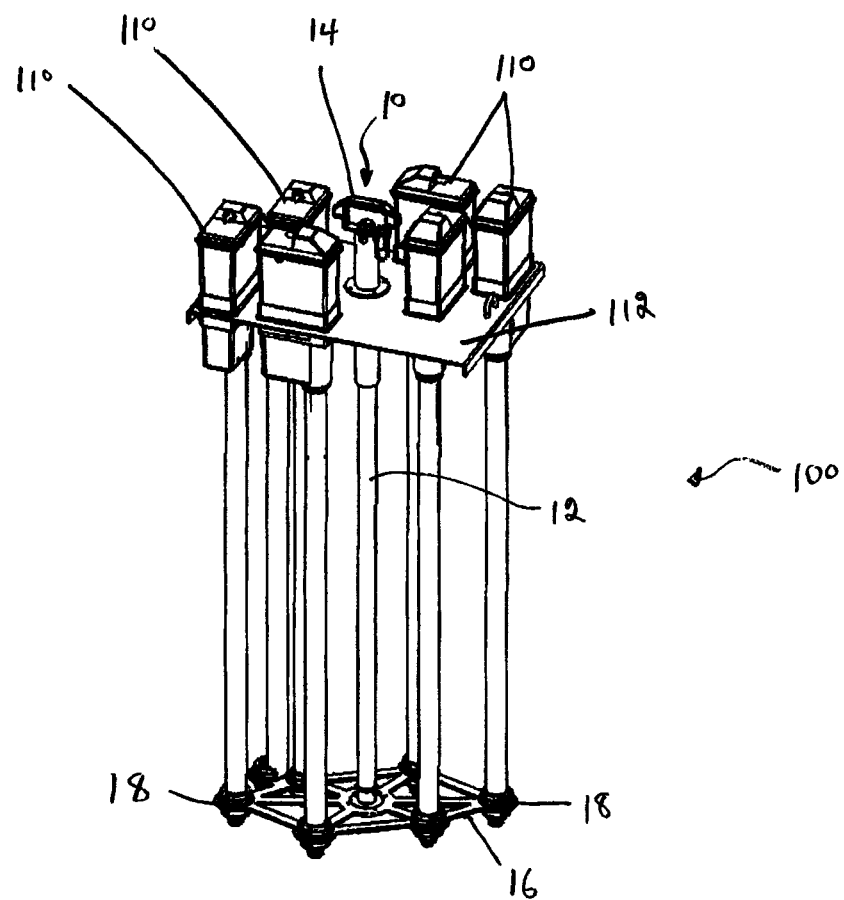
FIG. 6 illustrates a perspective view of the radiation source module illustrated in FIG. 1 wherein the cleaning apparatus is in the extended position.

The particular advantage of the embodiment illustrated in FIGS. 1-6 is that actuation tube 12, due to its size, also acts as a reservoir for the cleaning system allowing longer periods between replacement or replenishment of cleaning fluid. Cleaning fluid contained in this reservoir may be maintained in a pressurized or non-pressurized state. With particular reference to FIGS. 5 and 6, it will be appreciated by those of skill in the art that the cleaning fluid may be replaced or replenished when cleaning apparatus 10 is in the retracted position (FIG. 5), the extended position (FIG. 6) or any position therebetween.

With reference to FIGS. 7-11, there is illustrated a radiation source module 200. Radiation source module 200 is similar in many ways to radiation source module 100. The difference is actuation tube 12 of cleaning apparatus 10 in radiation source module 100 has been replaced with a remote filling assembly element 50. Remote filling assembly 50 is secured to cleaning carriage 16 of cleaning apparatus 10.

Remote filling assembly element 50 contains the same configuration of cleaning fluid feed and return inlets/outlets described in FIGS. 1-6. Thus, with reference to FIG. 9, it can be seen that remote filling assembly element 50 comprises a tubular portion 40 contained within which are cleaning fluid fill line 42 and cleaning fluid return line 44. Cleaning fluid fill line 42 is connected to cleaning fluid feed inlet 20 and cleaning fluid feed outlet 24. Cleaning fluid return line 44 is connected to cleaning fluid return outlet 22 and cleaning fluid return inlet 26. A cap element 46 is secured to a distal portion of remote filling assembly element 50. Cleaning fluid feed outlet 24 and cleaning fluid return inlet 26 are connected to the series of cleaning sleeves 18 as described above with reference to FIGS. 1-6.

Figure 10:
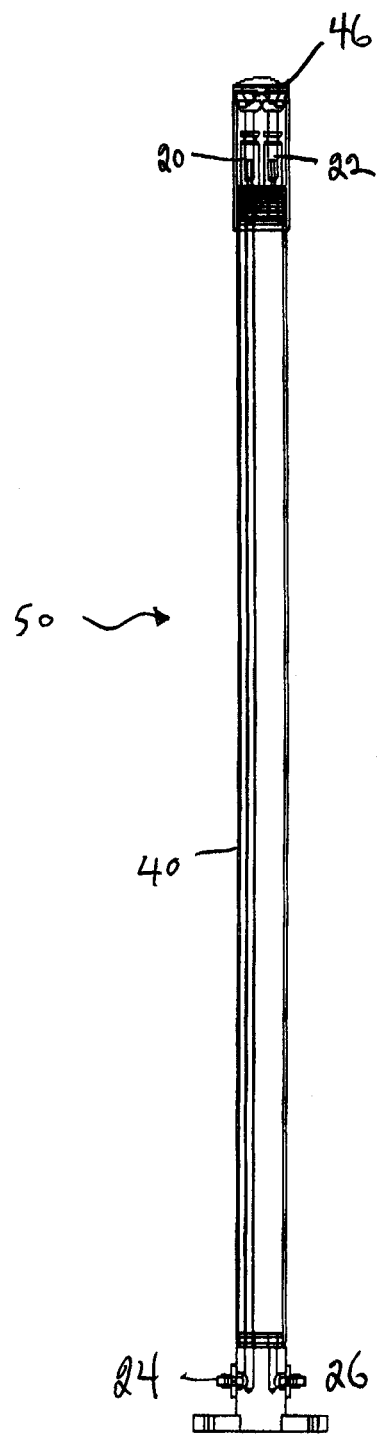
FIG. 10 illustrates a modified version of the remote filling assembly element illustrated in FIG. 9.

FIG. 10 illustrates a modified version of remote filling assembly 50 in which one of feed line 42 and return line 44 is omitted. Preferably, feed line 42 is omitted thereby rendering tubular element 40 as a reservoir for cleaning fluid (similar to the arrangement described above with reference to FIGS. 1-6).

Secured to mounting plate 112 is a parking tube element 125 having a replaceable cap 130 disposed at the distal portion thereof.

Figure 7:
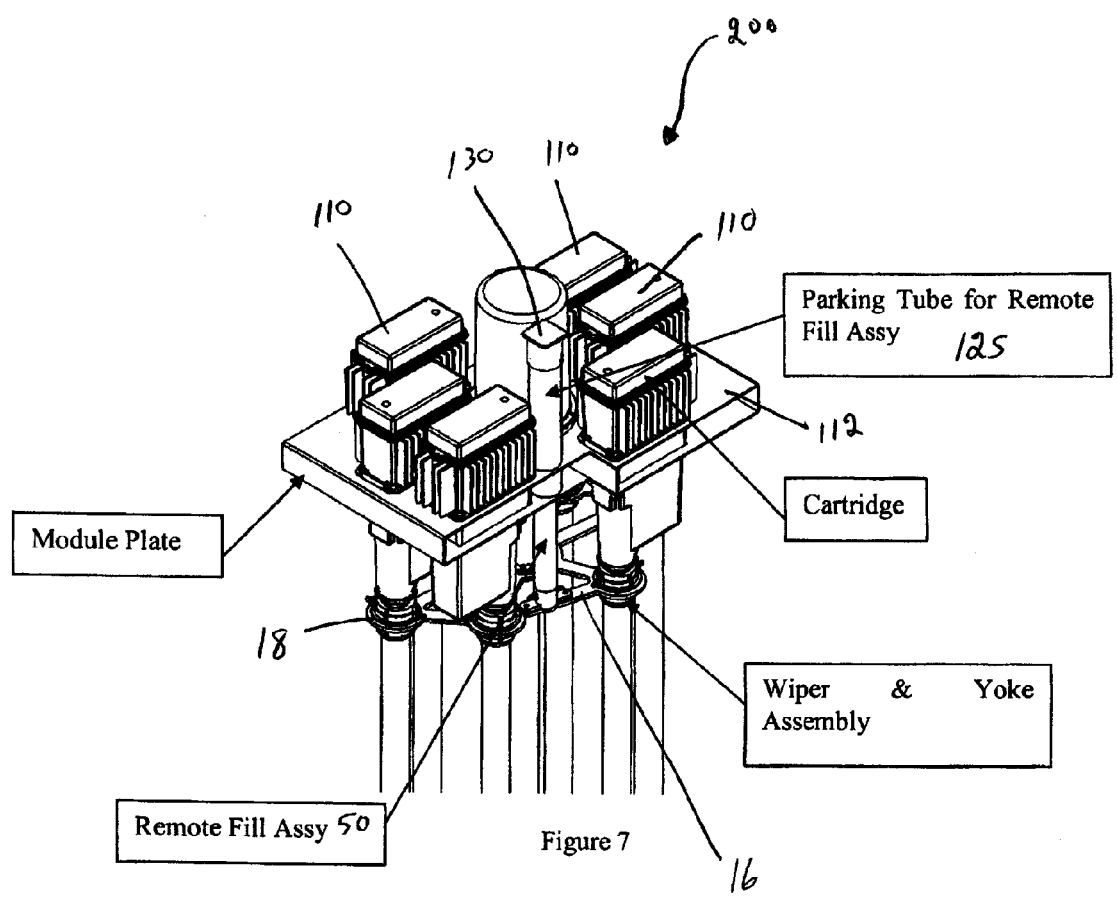
FIG. 7 illustrates an enlarged perspective view of the top portion of a radiation source module incorporating a second embodiment of the present cleaning apparatus in the retracted position.
Figure 8:
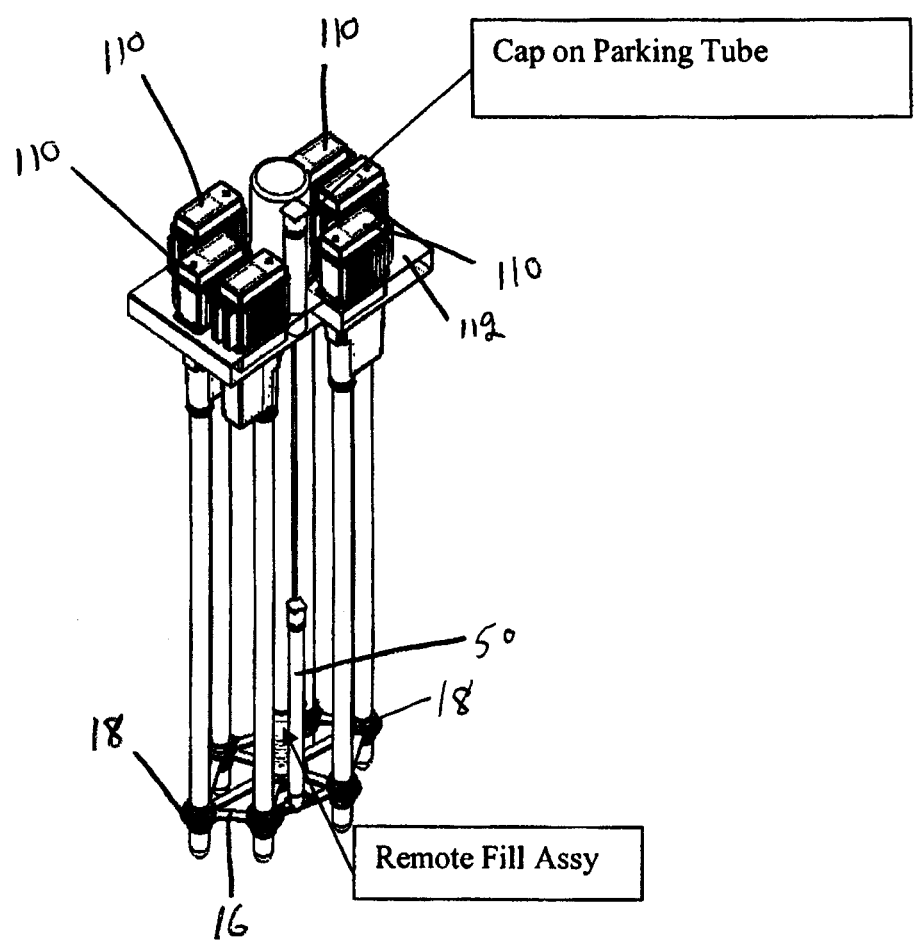
FIG. 8 illustrates a perspective view of the radiation source module as illustrated in FIG. 7 in the extended position.
Figure 9:
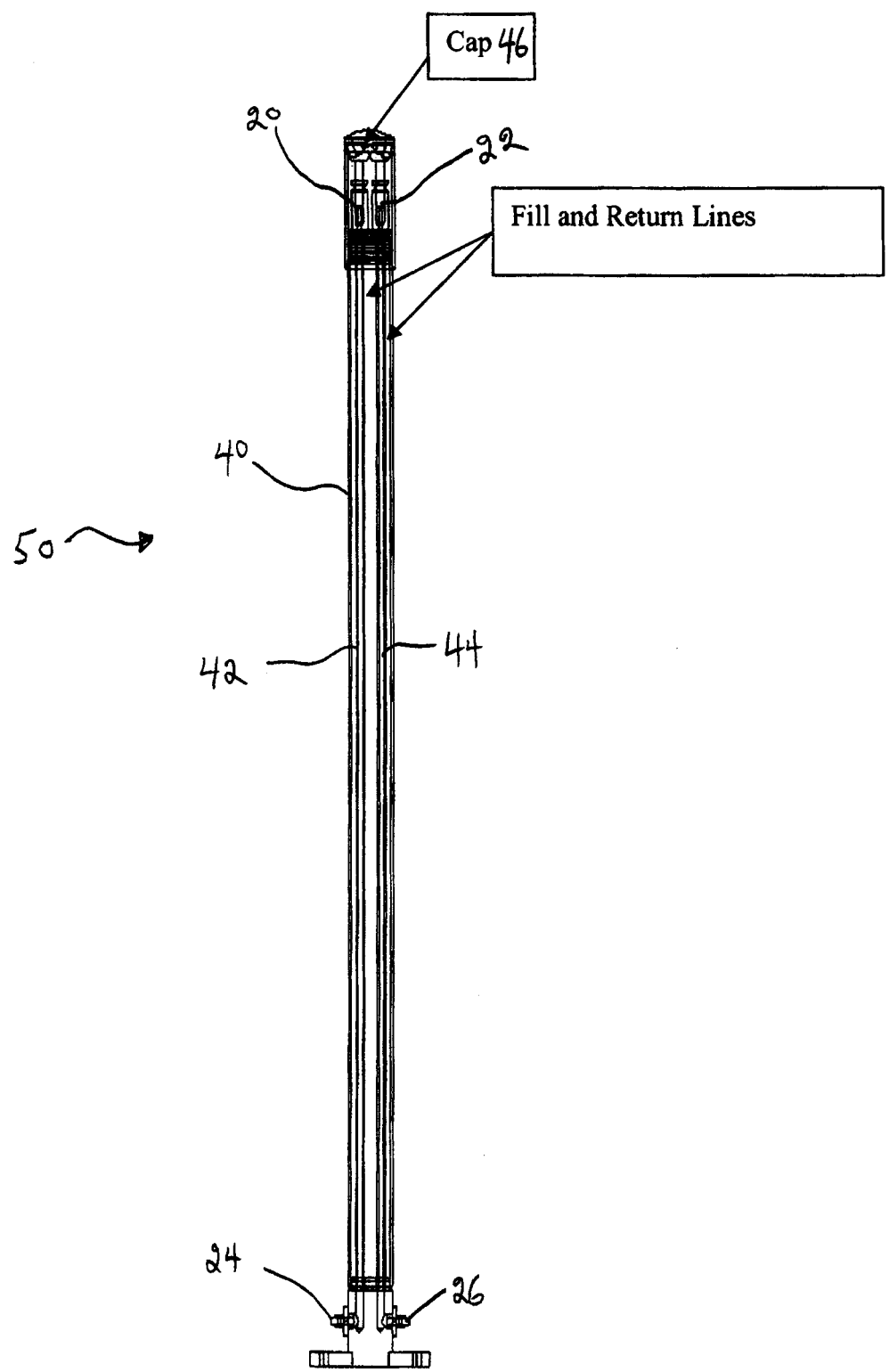
FIG. 9 illustrates an enlarged cross-sectional view of alternate embodiments of the remote filling assembly element useful in the cleaning apparatus used in FIGS. 7 and 8.
Figure 11:
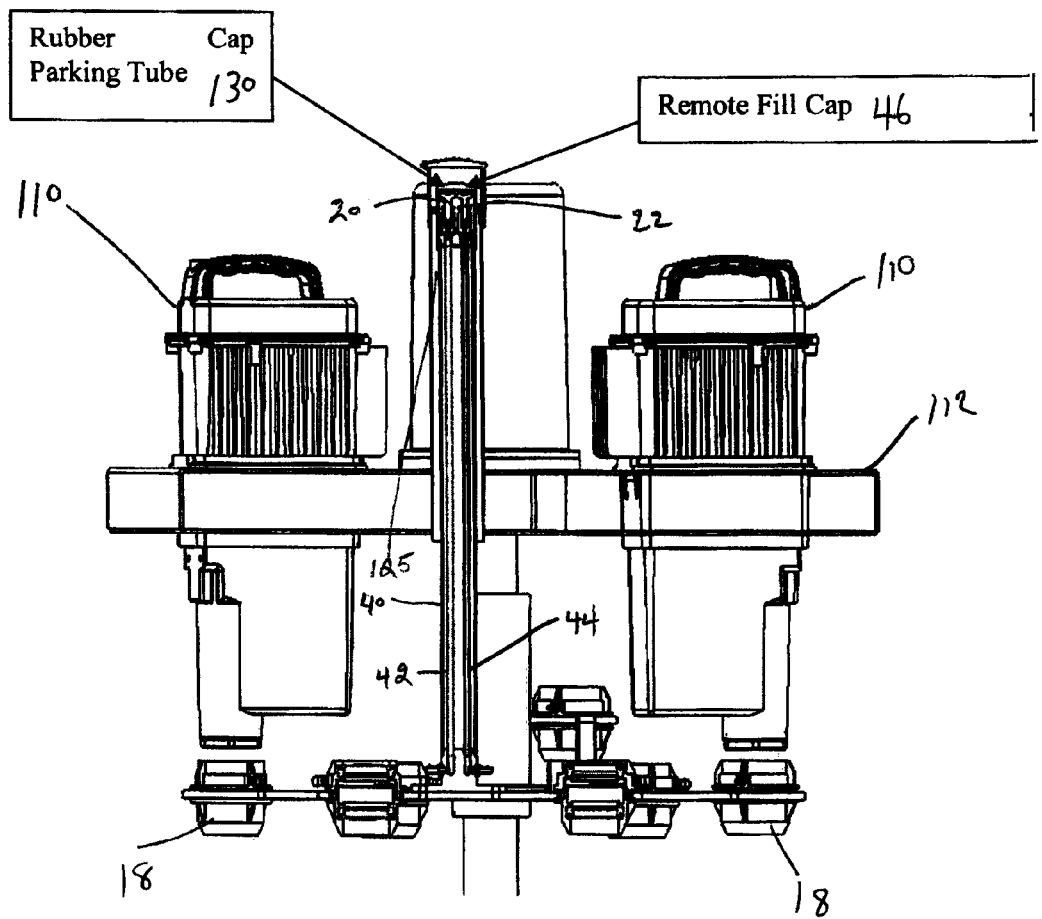
FIG. 11 illustrates a side elevation, in partial cross-section, of the radiation source module illustrated in FIG. 7.

Once it is desired to replace or replenish the cleaning fluid in radiation source module 200, cleaning apparatus 10 is moved to the retracted position—see FIGS. 7 and 11. Next, cap 130 is removed from parking tube assembly 125 and cap 46 is removed from remote filling assembly 50 thereby exposing cleaning fluid feed inlet 20 and cleaning fluid return outlet 22. At this point, the procedure described above with reference to FIGS. 1-6 is followed to replace or replenish the cleaning fluid in cleaning apparatus 10. Once completed, the connections to cleaning fluid feed inlet 20 and cleaning fluid return outlet 22 are terminated and caps 46,130 are replaced. Cleaning apparatus 10 may then be used to remove fouling materials from the radiation source assemblies in radiation source module 200.

Figure 12:
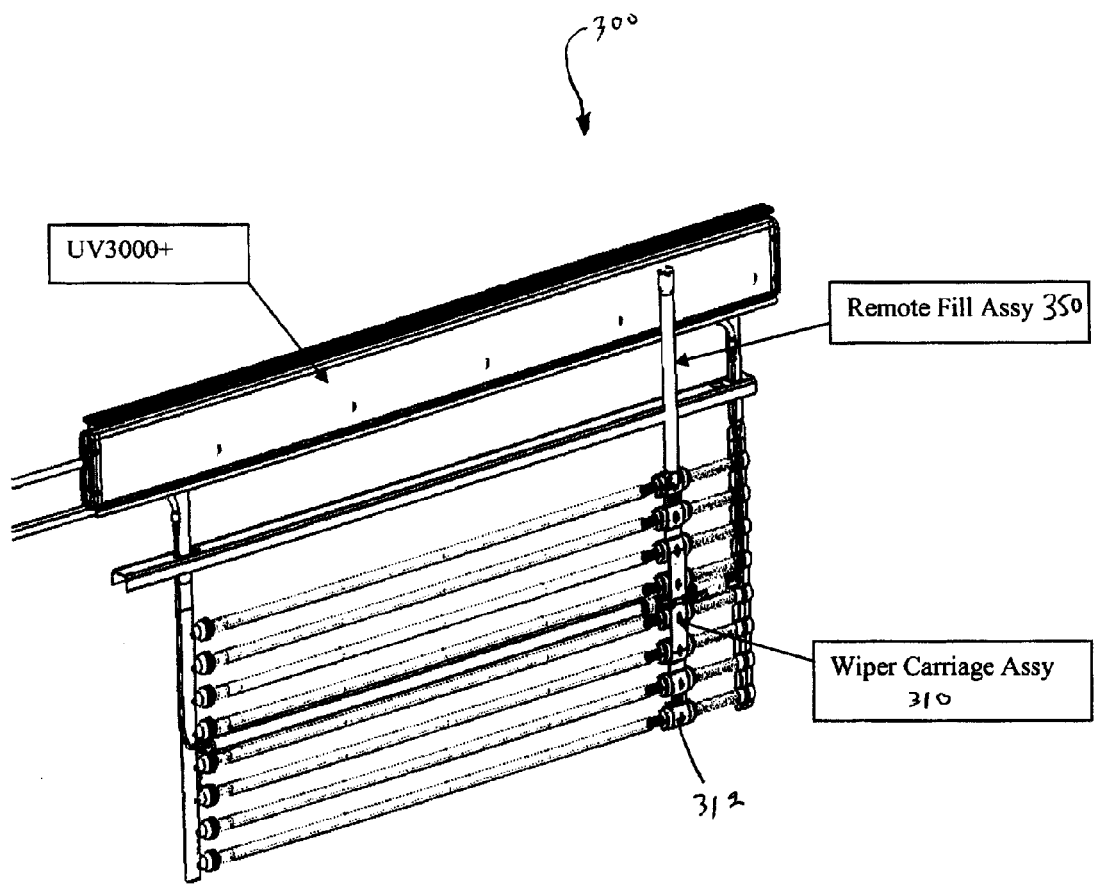
FIG. 12 illustrates a perspective view of a radiation source module incorporating a third embodiment of the present cleaning apparatus.

With reference to FIG. 12, there is illustrated a radiation source module 300 which is generally similar to the radiation source module illustrated in the Maarschalkerweerd #1 Patents and in U.S. Pat. Nos. 6,342,188, 6,646,269 and 6,659,431. In the illustrated embodiment, a remote filling assembly 350 similar to remote filling assembly 50 described with reference to FIGS. 7-11 is mounted to a cleaning carriage 310. Remote filling assembly 350 will ride back and forth on cleaning carriage 310 as the latter is moved back and forth along the exterior of the radiation source assemblies in radiation source module 300.

In the illustrated embodiment, the serial connection between remote filling assembly 350 and cleaning carriage 310 is done such that the bottom most cleaning sleeve 312 is connected to the supply of cleaning fluid and serially connected to the remaining cleaning sleeves in an upward direction. In this arrangement, the final cleaning sleeve connected in the series is at the top and it would be connected to the clean fluid return line on remote filling assembly 350. This approach of filling from the bottom to the top allows for purging of any air in cleaning sleeves to ensure they are substantially completely filled with cleaning fluid. The remaining connection and operation details for replacing or replenishing cleaning fluid in radiation source module 30 are as described above with reference to FIGS. 1-11.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, the specific embodiments illustrated in FIGS. 1-12 may be configured to operate in a manual, automatic or semi-automatic manner. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A cleaning apparatus for a radiation source assembly in a fluid treatment system, the cleaning system comprising:
    a cleaning carriage comprising a plurality of cleaning sleeves, each cleaning sleeve moveable to remove fouling materials from an exterior portion of the radiation source assembly, each cleaning sleeve comprising at least one chamber for receiving
    a cleaning fluid and a cleaning sleeve inlet in fluid communication with the at least one chamber;
    a first conduit element for conveying the cleaning fluid to the cleaning sleeve inlet, the first conduit element being configured such that a distal portion of the first conduit element is in fluid communication with the cleaning sleeve inlet and a proximal portion of the first conduit element is disposed outside of fluid being treated in the fluid treatment system and
    a tubular element having a distal portion connected to the cleaning carriage and configured to contain the first conduit element, a proximal portion of the tubular element configured to be disposed outside of fluid being treated in the fluid treatment system;
    wherein the plurality of cleaning sleeves are in serial fluid communication with each other to define a cleaning fluid fill line in fluid communication with the first conduit element, such that the cleaning fluid passes irreversibly from a first cleaning sleeve chamber into a second cleaning sleeve chamber.

2. The cleaning apparatus defined in claim 1, further comprising a second conduit element for conveying cleaning fluid from a cleaning sleeve outlet in fluid communication with the at least one chamber.

3. The cleaning apparatus defined in claim 2, where the second conduit element is configured such that a distal portion of the second conduit element is in fluid communication with the cleaning sleeve outlet and a proximal portion of the second conduit element is disposed outside of fluid being treated in the fluid treatment system.

4. The cleaning apparatus defined in claim 3, wherein a portion of the second conduit is disposed with the first conduit.

5. The cleaning apparatus defined in claim 4, wherein the combination of the first conduit and the second conduit define a reservoir for the cleaning fluid.

6. The cleaning apparatus defined in claim 4, wherein the combination of the first conduit and the second conduit define a substantially annular reservoir for the cleaning fluid.

7. The cleaning apparatus defined in claim 6, wherein the first conduit portion and the second conduit portion are secured with respect to one another.

8. The cleaning apparatus defined in claim 6, wherein the first conduit portion and the second conduit portion combine to define an actuation portion that is moveable with respect to the radiation source assembly.

9. The cleaning apparatus defined in claim 8, wherein the actuation portion comprises a handle portion for manual movement of the actuation tube.

10. The cleaning apparatus defined in claim 9, wherein the cleaning sleeve is moveable between a retracted position and an extended position.

11. The cleaning apparatus defined in claim 10, wherein the proximal portion of the first conduit element is disposed outside of fluid being treated in the fluid treatment system when the cleaning system is in the retracted position.

12. The cleaning apparatus defined in claim 10, wherein the proximal portion of the first conduit element is submersed in the fluid being treated in the fluid treatment system when the cleaning system is in the extended position.

13. The cleaning apparatus defined in claim 10, wherein the proximal portion of the first conduit element is: (i) disposed outside of fluid being treated in the fluid treatment system when the cleaning system is in the retracted position; and (ii) submersed in the fluid being treated in the fluid treatment system when the cleaning system is in the extended position.

14. The cleaning apparatus defined in claim 13, further comprising a tube portion for receiving the proximal portion of the first conduit element when the cleaning system is in the retracted position.

15. The cleaning apparatus defined in claim 14, wherein the tube portion comprises a cover element removable to gain access to the proximal portion of the first conduit portion.

16. The cleaning apparatus defined in claim 15, wherein the cleaning sleeve comprises an annular ring portion.

17. The cleaning apparatus defined in claim 1, wherein each cleaning sleeve is configured to be engaged to an exterior of the radiation source assembly.

18. The cleaning apparatus defined in claim 17, wherein pairs of cleaning sleeves are in fluid communication with each other to define a cleaning fluid fill line in fluid communication with the first conduit portion.

19. The cleaning apparatus defined in claim 18, wherein the plurality of cleaning sleeves are in fluid communication with each other to define a cleaning fluid return line in fluid communication with the second conduit portion.

20. The cleaning apparatus defined in claim 18, wherein pairs of cleaning sleeves are in fluid communication with each other to define a cleaning fluid return line in fluid communication with the second conduit portion.

21. The cleaning apparatus defined in claim 20, wherein the cleaning carriage comprises a plurality of cleaning sleeves disposed in a substantially annular relationship with respect to the first conduit portion.

22. The cleaning apparatus defined in claim 21, wherein each cleaning sleeve comprises a seal for sealing engagement with the portion of the exterior of the radiation source assembly, the seal removing at least a portion of undesired materials from the exterior of the radiation source assembly when the sleeve is moved.

23. The cleaning apparatus defined in claim 21, wherein each cleaning sleeve comprises a pair of seals for sealing engagement with the portion of the exterior of the radiation source assembly, the seal: (i) removing at least a portion of undesired materials from the exterior of the radiation source assembly when the sleeve is moved, and (ii) substantially reducing or preventing leaking of cleaning fluid from the chamber.

24. The cleaning apparatus defined in claim 23, wherein further comprising motive means (automatic or semi-automatic) to move the cleaning sleeve between a first position and a second position.

25. A radiation source module for use in a fluid treatment system, the module comprising:
   a frame having a first support member;
   at least one radiation source assembly extending from the first support member, the at least one radiation source assembly comprising a radiation source; and
   the cleaning apparatus defined in claim 23, the cleaning sleeve being in contact with at least a portion of an exterior of the at least one radiation source assembly.

26. The radiation source module defined in claim 25, further comprising means to position the radiation source module in the fluid treatment system.

27. The radiation source module defined in claim 26, wherein the at least one radiation source assembly is in sealing engagement with the first support member.

28. The radiation source module defined in claim 27, wherein the frame further comprises a Second support member opposed to and laterally spaced from the first support member, the at least one radiation source assembly disposed between each of the first support member and the second support member.

29. The radiation source module defined in claim 28, the frame further comprises a third support member interconnecting the first support member and the second support member.

30. The radiation source module defined in claim 29, wherein the frame further comprises a power supply for controlling the radiation source.

31. The radiation source module defined in claim 30, wherein the radiation source assembly comprises a protective sleeve surrounding the radiation source.

32. The radiation source module defined in claim 31, wherein the protective sleeve comprises a quartz sleeve.

33. The radiation source module defined in claim 32, wherein the protective sleeve has an open end in sealed engagement with an opening in the first support member and a closed end supported by the second support member.

34. The radiation source module defined in claim 33, wherein the open end is sealed to prevent contact between the fluid and the radiation source.

35. A fluid treatment system comprising:
   a fluid treatment zone comprised in an open channel for receiving a flow of fluid; and
   at least one radiation source module as defined in claim 1, wherein the at least one radiation source module is configured such that the one radiation source assembly is disposed in the fluid treatment zone.

36. The fluid treatment system according to claim 35, wherein the at least one radiation source assembly is elongate and has a longitudinal axis disposed transverse to the direction of fluid flow through the fluid treatment zone.

37. The fluid treatment system according to claim 35, wherein the at least one radiation source assembly is elongate and has a longitudinal axis disposed substantially parallel to the direction of fluid flow through the fluid treatment zone.

38. The fluid treatment system according to claim 35, wherein the at least one radiation source assembly is elongate and has a longitudinal axis disposed orthogonal to the direction of fluid flow through the fluid treatment zone.

39. The fluid treatment system according to claim 35, wherein the at least one radiation source assembly is elongate and is disposed substantially vertically in the fluid treatment zone.

40. A cleaning apparatus for a radiation source assembly in a fluid treatment system, the cleaning system comprising:
   a cleaning carriage comprising a plurality of cleaning sleeves, each cleaning sleeve moveable to remove fouling materials from an exterior portion of the radiation source assembly, each cleaning sleeve comprising at least one chamber for receiving
   a cleaning fluid, a cleaning sleeve inlet in fluid communication with the at least one chamber, and a cleaning sleeve outlet in fluid communication with the at least one chamber;
   a first conduit element for conveying the cleaning fluid to the cleaning sleeve inlet, the first conduit element being configured such that a distal portion of the first conduit element is in fluid communication with the cleaning sleeve inlet and a proximal portion of the first conduit element is disposed outside of fluid being treated in the fluid treatment system and
   a tubular element having a distal portion connected to the cleaning carriage and configured to contain the first conduit element, a proximal portion of the tubular element configured to be disposed outside of fluid being treated in the fluid treatment system;
   wherein the plurality of cleaning sleeves are in serial fluid communication with each other to define a cleaning fluid fill line in fluid communication with the first conduit element, such that the cleaning fluid passes in only one direction from (i) a first cleaning sleeve inlet to (ii) a first cleaning sleeve chamber to (iii) a second cleaning sleeve inlet into (iv) a second cleaning sleeve chamber.

41. A cleaning apparatus for a radiation source assembly in a fluid treatment system, the cleaning system comprising:
   a cleaning carriage comprising a plurality of cleaning sleeves, each cleaning sleeve moveable to remove fouling materials from an exterior portion of the radiation source assembly, each cleaning sleeve comprising at least one chamber for receiving
   a cleaning fluid, a cleaning sleeve inlet in fluid communication with the at least one chamber, and a cleaning sleeve outlet in fluid communication with the at least one chamber;
   a first conduit element for conveying the cleaning fluid to the cleaning sleeve inlet, the first conduit element being configured such that a distal portion of the first conduit element is in fluid communication with the cleaning sleeve inlet and a proximal portion of the first conduit element is disposed outside of fluid being treated in the fluid treatment system and
   a tubular element having a distal portion connected to the cleaning carriage and configured to contain the first conduit element, a proximal portion of the tubular element configured to be disposed outside of fluid being treated in the fluid treatment system;
   wherein the plurality of cleaning sleeves are in serial, non-parallel fluid communication with each other to define a cleaning fluid fill line in serial fluid communication with the first conduit element, such that the cleaning fluid passes serially from upstream cleaning sleeves to downstream cleaning sleeves.

* * * * *